United States Patent
Keramidas

[11] 3,933,645
[45] Jan. 20, 1976

[54] DEEP FAT FRYER TRAP

[76] Inventor: John D. Keramidas, 1214 Fort St., Lincoln Park, Mich. 48146

[22] Filed: July 8, 1974

[21] Appl. No.: 486,524

[52] U.S. Cl. .................. 210/305; 99/408; 210/455; 210/470; 210/477
[51] Int. Cl.² .......................................... B01D 23/26
[58] Field of Search ...... 99/403, 408; 210/167, 299, 210/305, 310, 455, 464, 465, 470, 473, 477, 497

[56] References Cited
UNITED STATES PATENTS

| | | | |
|---|---|---|---|
| 2,570,628 | 10/1951 | Anetsberger | 99/408 |
| 2,795,335 | 6/1957 | Coen | 210/497 |
| 3,392,845 | 7/1968 | Shapiro et al. | 210/470 |
| 3,638,558 | 2/1972 | Bennett et al. | 99/408 |

*Primary Examiner*—Charles N. Hart
*Assistant Examiner*—Richard W. Burks
*Attorney, Agent, or Firm*—Burton and Parker

[57] ABSTRACT

A deep fat fryer trap receivable in the fryer well has imperforate trap portions extending along opposite margins of the bottom wall and an oil straining portion along a narrow medial portion of the bottom wall. The side walls have upper marginal edges closely fitting the well walls. Oil straining portions are also disposed in the side walls spaced upwardly from the bottom.

5 Claims, 3 Drawing Figures

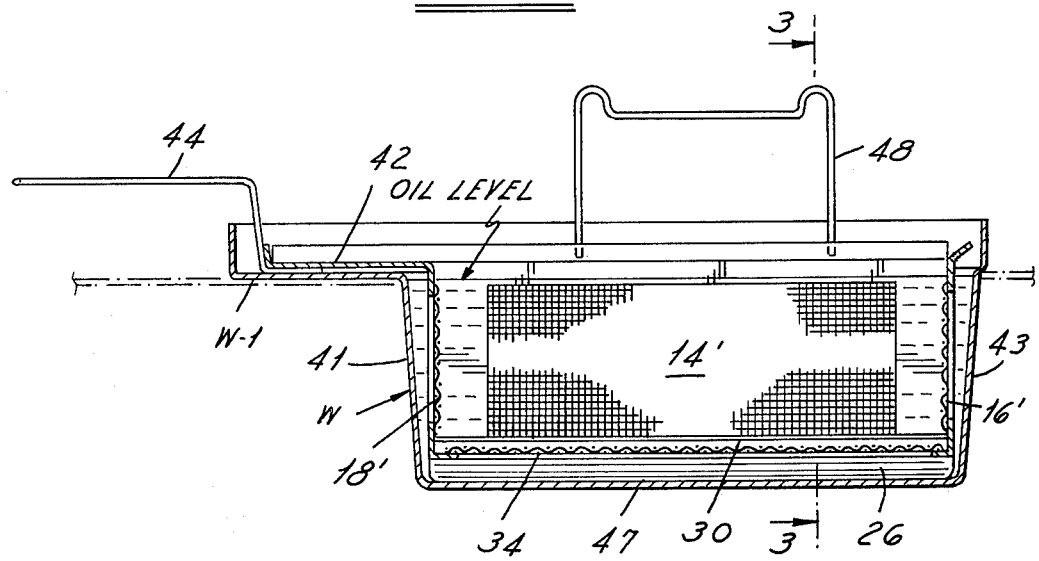

3,933,645

DEEP FAT FRYER TRAP

FIELD OF INVENTION

This invention relates to a crumb and sediment trap for a deep fat fryer, in particular a commercial type fryer such as would be found in restaurants.

BRIEF DESCRIPTION OF PRIOR ART

Heretofor others have suggested strainers and like devices for removing food crumbs from deep fat fryer oil so that such crumbs do not contaminate the oil or fryer well, but so far as I am aware, none of such devices have enjoyed any appreciable or widespread commercial success. It is my belief that none of such devices, for a variety of reasons, was wholly satisfactory. U.S. Pat. Nos. disclosures representative of the prior art are as follows:

| | |
|---|---|
| 2,570,628; | 2,716,938; |
| 2,635,527; | 2,716,939. |

In a commercial establishment where the deep fat fryer is in use eighteen hours or more during the day, it is necessary that the oil be kept free of food crumbs in a simple, safe, convenient and reliable manner and with minimal or no interference with the use of the fryer. I have found that a trap which nests in the well and which catches and holds the crumbs and which every few hours can be readily removed and cleaned, is the best solution. However, for such a trap to be satisfactory, I have determined it should embody a certain combination of features which I have not found in prior deep fat fryer strainers. First, in the prior art, the approach has not been to provide a trap which essentially removes the food crumbs from the circulating hot cooking oil, and as a result such crumbs can continue to circulate with the oil to contaminate it as well as the food being cooked. Second, there has been little or no attention to positively physically isolating such crumbs so that they are removed from the circulating hot oil. Third, the foregoing concepts have not heretofor been embodied in a device which is received in nesting relation in the fryer well and which is relatively inexpensive and easy to handle and clean.

SUMMARY OF THE INVENTION

My deep fat fryer trap comprises a box like device formed of stainless, copper, or other suitable material, and has a bottom, side and end walls. Such walls define a pair of crumb traps at opposite sides of the bottom wall. The bottom wall has an elevated medial ridge portion provided with an oil straining mesh screen. The sides and end walls are also provided with oil straining mesh screen throughout the major portions of the areas thereof but with such screen spaced from the marginal edges of such walls. A pair of baffles are provided arranged inside and spaced above and parallel to the bottom walls with the outer edges disposed abutting the end and side walls and with the inner edges spaced apart and terminating adjacent the ridge where the oil strainer is disposed. In addition, an apron projects from one end of the device and a lifting handle is secured to the apron. The upper marginal edges of the side walls and an end wall are flared laterally outwardly to meet the well walls of the fryer. The baffles serve to isolate crumbs on the bottom from the oil circulating above the baffles and in contact with the food being cooked.

BRIEF DESCRIPTION OF THE DRAWINGS

FIG. 2 is a longitudinal cross sectional view through a deep fat fryer well with my trap disposed therein, and similar to a side elevation taken on a line 2—2 of FIG. 3; and;

DESCRIPTION OF PREFERRED EMBODIMENT

Figure 1:
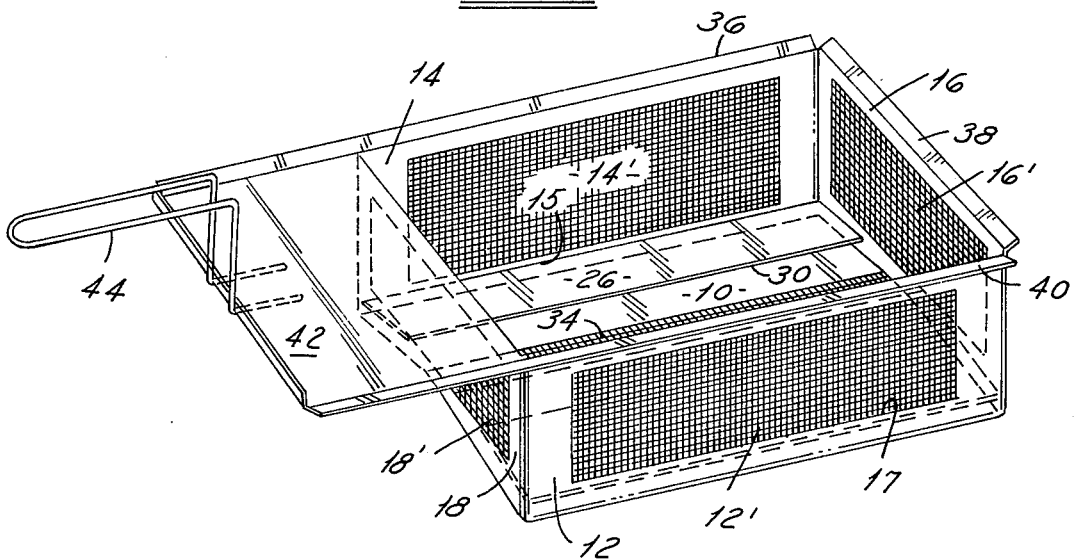
FIG. 1 is perspective view showing my deep fat fryer trap.
Figure 3:
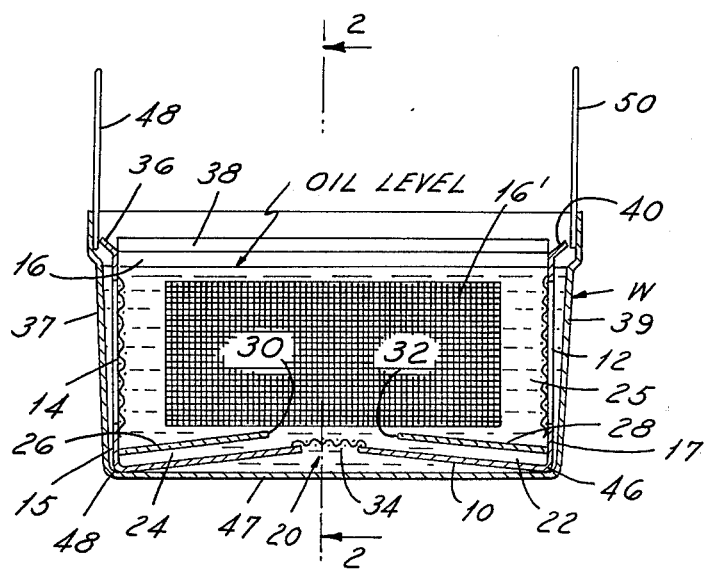
FIG. 3 is a cross sectional view taken on a line 3—3 of FIG. 2.

As shown in FIG. 1 my deep fat fryer trap comprises a box-like receptacle having a bottom wall 10, side walls 12 and 14 and end walls 16 and 18. The bottom wall 10 slopes upwardly from the opposite side walls 12 and 14, as best shown in FIG. 3 to a ridge portion 20 along the medial area of the bottom wall and a pair of crumb traps 22 and 24 are located along opposite sides of the ridge portion of the bottom wall adjacent the side walls 12 and 14. The outer edges of such crumb traps 22 and 24 are defined by imperforate wall portions 15 and 17 of the side walls 12 and 14 which are about one inch high. The traps are further augmented and isolated from the cooking oil 25 by a pair of baffles 26 and 28, which are spaced above the bottom wall 10 arranged parallel to it with outer edges of the baffle connected to the side and end walls and with the inner edges 30 and 32 being arranged in opposed spaced apart relation on opposite sides of ridge portion 20.

The ridge portion 20 of the bottom wall while open to permit the cooking oil to flow therethrough, is covered by a wire mesh oil strainer screen 34 of gage. The side and end walls are largely open to the flow of the cooking oil therethrough with the open spaces being covered by wire mesh screens of 12', 14', 16', and 18' of the same gage as screen 34.

The upper edges of the side walls 12 and 14 and end wall 16 are laterally outwardly flared as at 36, 38, and 40 to meet or lie closely adjacent the walls 37, 39, 41 and 43 of the well W of the deep fat fryer shown in FIGS. 2 and 3. The end wall 18 is provided with a laterally outwardly extending apron 42 which overlies an extension W-1 of the well. A lifting handle 44 is connected to the apron 42 for manual lifting of the trap into and out of deep fat fryer well.

Crumbs of food that may fall into the fryer well W from food baskets (not shown) temporarily mounted on the supports and well carrying handles 48 and 52, or which may fall from food being placed in the well, will be deflected by the flanges 36, 38 and 40 and apron 42 so that they do not drop into the cooking oil between the trap and well walls 37, 39, 41 and 43. The trap side and end walls project upwardly above the top surface (oil level) of the cooking oil as shown in FIGS. 2 and 3 thereby preventing any food crumbs in the oil within the trap from escaping from the confines of the trap during bubbling or agitation of the oil during cooking of food therein, and also and importantly upon removal of the trap from the well the crumbs are required to remain in the trap and cannot escape into the oil remaining in the fryer well as the trap is lifted therefrom.

The lower outer edges 46 and 48 of the bottom wall of my trap structure are adapted to abut the bottom 47 of the well with the ridge portion 20 of the bottom wall thereby spaced upwardly from the bottom of the well permitting the flow of the hot oil through the ridge portion for circulation within the well.

Crumbs from the food being cooked, tend to accumulate within the trap portions 22 and 24 and thereby are essentially removed from the circulation of the cooking oil as will be apparent from a consideration of FIGS. 2 and 3. By virtue of the slope of the bottom wall, the crumbs tend to migrate down the bottom wall to the outer corners where they lie in a quiescent condition until the trap structure is removed from the well for cleaning.

When the well is to be cleaned of the accumulated crumbs, the food baskets (not shown) are removed, and then by grasping the lifting handle 44 the trap structure may be raised out of the well and as it is raised the hot oil therewithin will drain through the side and end screens, and ridge screen into the well. The large open (but screened) areas of the side and end walls permits the lifting of the trap without danger of the hot cooking oil being spilled, and when it is remembered that where a fryer is in constant use and personnel are under pressure and in a hurry they are not as careful as at other times, the capability of quickly removing the trap becomes an important characteristic. The trap structure may then be carried to a sink or washing area where it may be thoroughly cleaned. If the restaurant is provided with a second trap structure, the same having been previously made ready, can be immediately inserted in the deep fat fryer while the contaminated trap is being cleaned and prepared for use when the second trap itself is to be removed for cleaning.

My experimentation has indicated the importance of trapping the food crumbs in areas of relative isolation from the turbulence of the cooking oil during the food cooking operation. I have found, found, for example, that with use of a trap structure of the character herein disclosed, the cooking oil will last many times longer. Particularly effective results are obtained if the trap is removed every 2 or 3 hours and a clean trap substituted. It is my belief that the outward and downward slope of the imperforate areas of the bottom wall in combination with the imperforate areas 47 and 49 of the side walls, which together define the trap areas 22 and 24, serve to collect and hold the food particles from circulating with the hot cooking oil and prevent carry-over of taste from one food batch to another and also breakdown of the oil itself. I have found that these trap areas are effective even without the baffles 26 and 28 and I believe this is because such trap areas are remote from the ridge screen 34 where there is a substantial flow-through current of oil.

I have found that there seems to be a reduction in the amount of fuel required to effect cooking of foods in a deep fat fryer provided with one of my trap structures.

What is claimed is:

1. A deep fat fryer trap having bottom, side and end walls connected to form a box-like structure, said bottom wall sloping upwardly from the opposite side wall to a ridge portion along the medial area thereby defining a pair of crumb traps along opposite sides of the ridge portion of the bottom wall, said bottom wall being imperforate except for the ridge portion, a crumb strainer screen disposed along said ridge portion, said side and end walls being largely open and having crumb strainer screens extending across the open areas thereof, baffle means extending over the pair of traps and spaced upwardly therefrom in substantially parallel relation with the bottom wall to isolate crumbs in the traps from cooking oil above the baffles, an apron connected to and extending laterally from the upper edge of one of the end walls, the upper edges of the remaining end and side walls flaring laterally outwardly to substantially meet the walls of a fryer well when the trap is placed therein, and a lifting handle connected to said apron and projecting outwardly there beyond.

2. A deep fat fryer trap comprising bottom, side and end walls, said bottom wall sloping upwardly from said side walls to a medial ridge portion, said walls having imperforate portions defining crumb traps along opposite edges of the bottom wall adjacent the side walls, said bottom wall having a narrow crumb strainer extending along the medial ridge portion between the traps, baffle means extending over the crumb traps in spaced relation above the bottom wall for isolating the crumb traps, and the upper marginal edges of said side and end walls adapted to extend above the level of oil in a fryer well within which the trap is received.

3. The invention defined by claim 2 characterized in that said side and end walls have crumb strainer areas extending throughout a major portion of each but spaced inwardly from the marginal edges thereof.

4. The invention defined by claim 2 characterized in that an apron portion extends laterally from the upper edge of one end wall to provide a crumb catcher, and a lifting handle is connected to said apron whereby the trap may be lifted into or out of the well.

5. The invention defined by claim 2 characterized in that the upper marginal edges of the side and end walls are flared outwardly substantially to meet the well walls of a fryer in which the trap is received.

* * * * *